United States Patent [19]

Kielminski

[11] Patent Number: 4,679,831
[45] Date of Patent: Jul. 14, 1987

[54] PIPE COUPLING CONNECTION SEALING APPARATUS

[76] Inventor: William P. Kielminski, 601 Cypress Station Dr., #203, Houston, Tex. 77090

[21] Appl. No.: 874,011

[22] Filed: Jun. 13, 1986

[51] Int. Cl.$^4$ .............................. F16L 21/02
[52] U.S. Cl. .................. 285/332.2; 285/333; 285/355; 285/369; 285/383
[58] Field of Search .................. 285/383, 332.2, 910, 285/350, 333, 334, 355, 369

[56] References Cited

U.S. PATENT DOCUMENTS

| | | | |
|---|---|---|---|
| 1,889,868 | 12/1932 | Montgomery | 285/383 X |
| 2,150,221 | 3/1939 | Hinderliter | 285/383 X |
| 2,740,423 | 4/1956 | Stillwagon | 285/383 X |
| 2,766,998 | 10/1956 | Watts et al. | 285/910 X |
| 3,100,656 | 8/1963 | MacArthur | 285/332.2 X |
| 3,989,285 | 11/1976 | Yancey | 285/363 X |
| 4,269,437 | 5/1981 | Shaw et al. | 285/109 |
| 4,398,754 | 8/1983 | Caroleo et al. | 285/383 X |

FOREIGN PATENT DOCUMENTS 446334  1/1950  Italy ..................... 285/383

*Primary Examiner*—Thomas F. Callaghan
*Attorney, Agent, or Firm*—Hubbard, Thurman, Turner & Tucker

[57] ABSTRACT

A pipe coupler with sealing apparatus for use with lined or unlined pipes has a pipe connector member having a bore for receiving a floating seal means intermediate to threaded pipe holding portions. The bore includes a bottom portion between first and second recesses. The first recess is provided with a stop side for prepositioning the floating seal means. The floating seal means includes a steel ring having opposing end recesses; the inner diameter side and two ends are substantially encased with a resilient plastics material. The steel ring has a width greater than the width of the bore's bottom portion. When pipes are initially fitted to the pipe connector, the steel ring abuts the stop member with the resilient plastics extending over the stop. When finally torqued, the torque is equalized between the pipes, and the steel ring of the floating seal means is centered over the bore's body portion with ends extending partially over the bore's recesses. The resilient plastics is forced into the steel ring's and bore's recesses to seal the pipe's ends against leakage without bulging the inner diameter plastics thereby keeping it flush with the pipe's inner diameters.

6 Claims, 3 Drawing Figures

PIPE COUPLING CONNECTION SEALING APPARATUS

BACKGROUND OF THE INVENTION

This invention relates to pipe couplings and more particularly to a rigid tube connection sealing apparatus.

In the past, various structures have been proposed for jointing pipes. One such annular joint structure includes an annular ring of resilient material having a T-shaped cross-section. A metal ring centering member also having a T-shaped cross-section supports a pair of opposing spring sheet parts; these elements are embedded in the annular ring. When the pipe ends are forced together the resilient material of the annular ring seals the ends of the pipes and forces the metal spring members together so that axially extending portions thereof are urged radially outwardly against the inner surface of the two pipe ends to ensure a complete seal between the joint itself and the two pipe ends. Those persons desiring more information concerning this structure are referred to U.S. Pat. No. 4,269,437, issued May 26, 1981 to Shaw et al. Other pipe coupling structures are shown in U.S. Pat. No. 4,568,113 issued Feb. 4, 1986, to Axford et al. for a "Pipe Connection"; U.S. Pat. No. 3,100,656 issued Aug. 13, 1963 to M. D. MacArthur for a "Synthetic Resin Seal Ring In Tubing Joint For Plastic Coated Tubing"; U.S. Pat. No. 3,266,821 issued Aug. 16, 1966 to W. J. Safford for a "Sealed Pipe Coupling"; U.S. Pat. No. 2,793,833, issued May 28, 1957 to B. A. Main, Jr. for a "Flexible Joint For Rigid Tube"; U.S. Pat. No. 4,431,845, issued Nov. 8, 1983 to Lawrence for "Pipe Couplings"; U.S. Pat. No. 4,230,157, issued Oct. 28, 1980 to Larsen et al. for a "Pipe Having An End Portion, The Inner Wall Of Which Is Provided With A Circumferential Groove, In Which A Sealing Means Is Mounted And A Pipe Joint consisting Of This Pipe And A Spigot End Of A Second Pipe Inserted Therein"; and U.S. Pat. No. 3,989,285 issued Nov. 2, 1976 to Yancey for a "Compatible Vacuum Seal".

The problems confronting the pipe coupling art relate to leakage and pipe corrosion. In addition in connected pipes, through which hardware items are passed, such as, for example, oil well drilling bits, seals having inside protrusions are damaged when hit by the hardware thereby causing leakage. In 8-Round threaded pipes used in many oil and gas wells having a sour gas environment or high pressure or both, leakage can become a problem. By design, 8-round threaded pipes have an inherent helical leak path in the threads that must be blocked; a pipe dopant has been used to seal off this leakage path. Dopant dryout can result in leakage through the thread gaps. Further, in systems having significant gaps between pipe ends, gas turbulence induces corrosion and washout of thread which results in leakage and failure of the pipe.

SUMMARY OF THE INVENTION

Accordingly it is an object of the invention to provide an improved pipe coupling.

Another object of the invention is to provide an improved pipe coupling connection sealing apparatus suitable for use in connecting pipes through which hardware items may be passed without seal damage.

Still another object of the invention is to provide an improved pipe coupling connection sealing apparatus for substantially eliminating turbulence corrosion.

A further object of the invention is to provide an improved pipe coupling connection sealing apparatus for substantially eliminating pipe thread washout.

Briefly stated the invention comprises an improved pipe coupling connection sealing apparatus for use in both lined and unlined pipes having a pipe coupling connector member. An internal, floating seal means is provided in the pipe connector, the seal is responsive to the connecting action of the pipe connector for forming a seal between the connector member and floating seal means whereby the pipe ends are sealed against leakage. The internal, floating seal means is also flush with the interior diameter of the pipes and with substantially no gaps between the pipe ends.

BRIEF DESCRIPTION OF THE DRAWINGS

Other objects and features of the invention will become more readily understood from the following detailed description and appended claims when read in conjunction with the accompanying drawings in which:

DESCRIPTION OF THE PREFERRED EMBODIMENT

Figure 1:
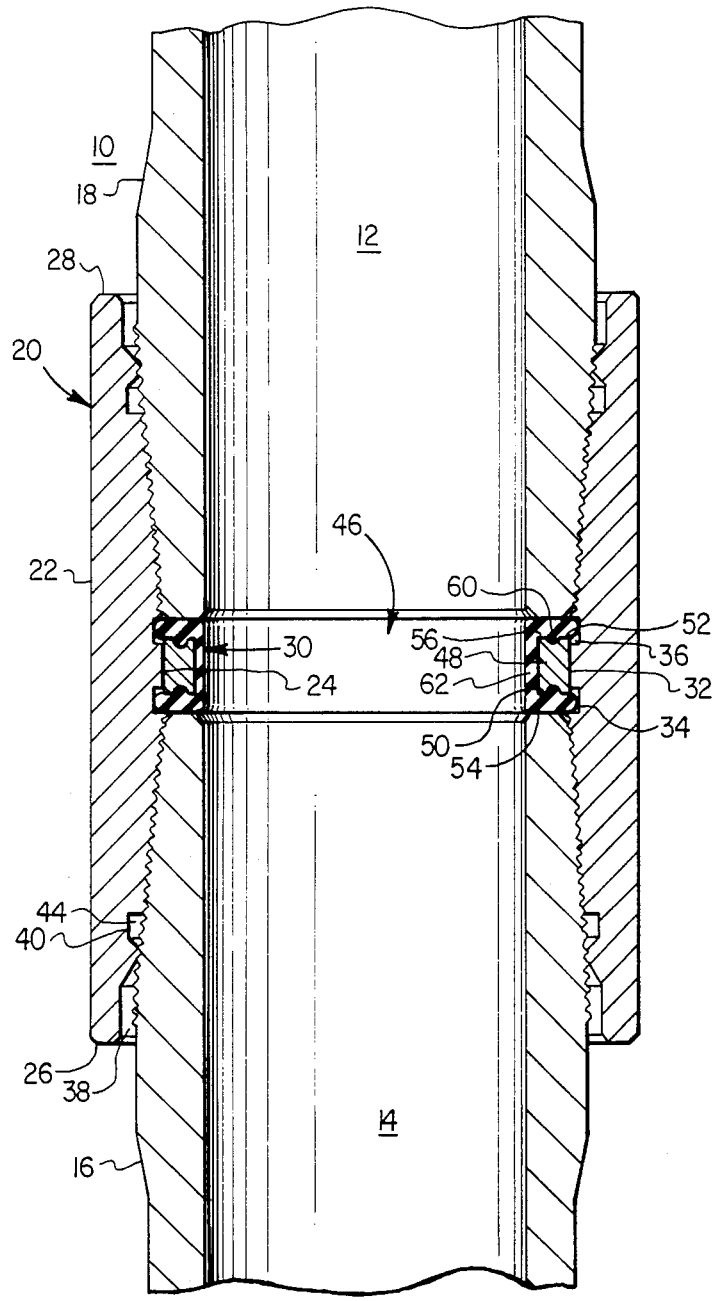
FIG. 1 is a schematic fragmentary cross-sectional view of the pipe coupling connection sealing apparatus.

The pipe coupling connection sealing apparatus 10 (FIG. 1) of this invention is shown with ends of pipes 12 and 14. The pipes 12 and 14 have threaded, inwardly sloping exterior surfaces 16 and 18 for receiving the coupling connector 20. The ends of the pipes 12 and 14 have beveled ends for a hereinafter described purpose.

Coupling connector 20 is an open ended cylinder having in cross-section a flat exterior surface 22. The interior surface of the coupling connector 20 includes a centrally located, horizontally disposed thick portion 24 having opposing ends integrally connected to pipe holding portions 26 and 28. A bore 30 is formed in the horizontal portion 24; the bore includes a flat bottom area 32 spaced between trap recesses 34 and 36. The pipe side of recess 34 extends upwardly of the bore's bottom to provide a stop 64 for an internal, floating sealing ring 46. While, the pipe holding portions 26 and 28 have threaded interior surfaces, tapered to correspond to the threaded tapered pipe surfaces and provided with recesses 38 and 40 adjacent to the ends thereof for pipe sealing rings 42 and 44.

The internal, floating sealing ring 46 is mounted within the bore 30. The sealing ring 46 includes a cylindrical ring 48, preferably of steel, having first and second sides 50 and 52 and opposing ends 54 and 56. Half circle shaped recesses 58 and 60 are formed centrally in the opposing ends 54 and 56. The first side 50, or side facing the pipe interiors, and the opposing ends 54 and 56 are substantially encased in a suitable resilient material, such as, for example, a plastics 62.

In the inoperative state (FIG. 2) the plastic casing 62 does not enter either the side recesses 58 and 60 of the steel ring or the recesses 34 and 36 of the bore 30. The steel ring 48 has a length partially overlapping the spaced recesses 58 and 60, and the plastic casing has end thicknesses which when added to the steel ring's length equals the bore length. Further, the thickness of the steel ring and the thickness of the plastic covering its interior side 50 equals the unbeveled end thickness of the pipes 12 and 14. With the length of the steel ring 48 being less than the bore's length, the steel ring in the inoperative state floats between the stop end 64 of recess 34 and the end of pipe 12. While, the end plastic material, which terminates just above the tops of the recesses, clears the trap recesses a distance sufficient for proper seating during operation.

Figure 3:
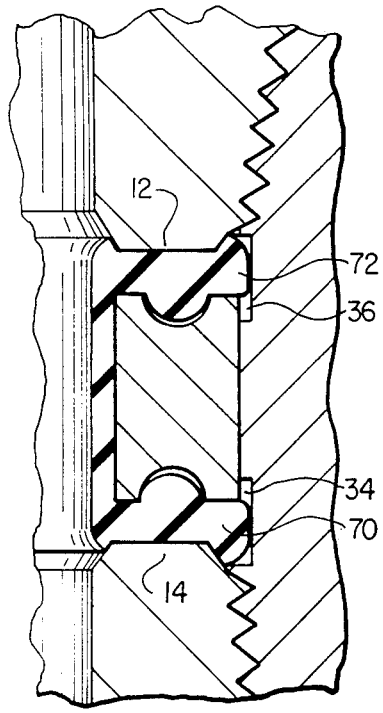
FIG. 3 is an enlarged fragmentary cross-sectional view of the seal ring in the operative position with respect to the pipe ends.
Figure 2:
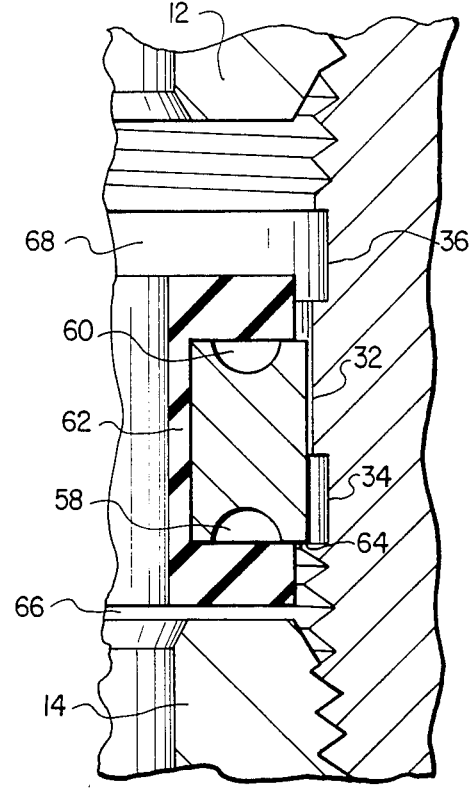
FIG. 2 is an enlarged fragmentary cross-sectional view showing the seal ring of the pipe coupling connection sealing apparatus in the floating position.

In operation the pipes 12 and 14 are positioned inside the coupling connector 22 and the coupling connector rotated as far as possible by hand to a starting position such as that shown in FIG. 2. As shown in FIG. 2, spaces 66 and 68 of one to three thread pitches could exist at the inoperative position. Thereafter, a suitable (torque) wrench is used to turn the coupling connector until a specified torque value measured in foot pounds to a tolerance of plus or minus ten percent is measured; at this torque the beveled ends of the pipes 12 and 14 have engaged the plastic ends 70 and 72 (FIG. 3) of the seal ring 46 to float the steel ring into its final longitudinal position, and to flow the sealing plastic into the steel ring's end recesses 58 and 60 and into the bore's recesses 34 and 36 for proper sealing seating. It is to be understood that proper sealing includes sealing without bulging of the plastics into the pipes inner diameter. It will be appreciated by those persons skilled in the art that with this arrangement the seal ring has floated to a position allowing torque to equalize on the ends of pipes 12 and 14. In practice of the invention, a leak-proof seal has resulted regardless of change in thread diameters on the pipes as long as both are in A.P.I. 8-Round thread specification.

Although only a single embodiment of this invention has been described, it will be apparatus to a person skilled in the art that various modifications to the details of construction shown and described may be made without departing from the scope of this invention.

What is claimed is:

1. A pipe coupler for use with either lined or unlined pipes comprising:
   (a) a pipe coupling connector means including a pipe connector member having a centrally disposed bore having a body portion with first and second ends and first and second recesses integral with the first and second body end portions; and
   (b) a floating seal means operatively connected to the pipe connector member, said floating seal means responsive to the pipe being joined for floating to a final position thereby allowing torque to equalize on the ends of the joined pipes, said floating seal means being operatively mounted in said bore and including a cylindrically shaped metal ring operatively connected to the pipe connector member, said metal ring having first and second opposing sides and ends, the opposing ends having recesses, and said first side and said first and second opposing ends of the metal ring being encased in a flexible sealing material whereby the ends of pipes being joined force the sealing material into the metal rings first and second recesses and into the bores first and second recesses to seal the ends of the pipes against leakage.

2. A pipe coupler according to claim 1, wherein the bore's first recess has a stop forming side for engaging and prepositioning the metal ring of the floating seal means with said resilient material of the first end of the metal ring extending past the bore's recess stop, said metal ring having a width greater than the width of the bore's body portion, whereby when the connector member is torqued the metal ring of the floating seal means is centered with respect to the bore's body portion with ends extending partially over the bore's recesses and the resilient sealing material is forced into the metal ring's and bore's first and second end recesses with the metal ring's first side resilient material remaining substantially flush with the adjoining pipes' interior diameters.

3. A floating self-centering sealing apparatus for connecting two A.P.I. 8-round or buttress threaded oil field pipes for use in oil and gas wells comprising:
   (a) a coupling having spaced threaded portions adjacent to each end to receive pipes having threaded end portions meeting A.P.I. 8-round thread specification, said coupling including spaced first and second recesses adjacent to inner ends of the spaced threaded portions, and a bore portion intermediate the first and second recesses, and
   (b) a floating seal means including a metal ring selectively encased with a resilient material, and having a predetermined bore length said metal ring having a longitudinal dimension less than that of the bore length with its resilient material covering the recesses a distance sufficient for proper seating therein during pipe connection whereby the floating seal means provides a fixed torque shoulder for longitudinally positioning correctly the pipe ends with respect to each other for allowing torque equalization on the ends of the pipes and a sealing connection between the pipes thereby maximizing the service life of the pipes.

4. A floating self-centering sealing apparatus according to claim 3, wherein the first recess of the coupling includes an outer side wall forming a stop for the metal ring selectively encased with the resilient material whereby the floating seal means is positioned within the coupling for pipe connection.

5. A floating self-centering sealing apparatus according to claim 3 wherein the metal ring has first and second opposing ends having recesses formed therein adapted to receive the resilient material responsive to engagement by the ends of the pipes being connected.

6. A floating self-centering sealing apparatus according to claim 5 wherein the metal ring has first and second opposing sides and said resilient material encases the first side and first and second opposing ends of the metal ring whereby the resilient material when engaged by the connecting pipes is sealingly expanded into the first and second recesses of the coupling and metal ring thereby leaving the second opposing side of the metal ring and adjacent connecting pipe interiors free of said resilient material for passing objects through the pipes without seal damage.

* * * * *